March 26, 1968  M. K. FORSYTH  3,374,560
TEACHING AID
Original Filed Nov. 24, 1964  2 Sheets-Sheet 2

INVENTOR.
MARIE K. FORSYTH
BY
*Alvan S. Blodgett*

United States Patent Office 3,374,560
Patented Mar. 26, 1968

3,374,560
TEACHING AID
Maria K. Forsyth, Worcester, Mass. (% American Embassy, APO Box 260, New York, N.Y. 09080)
Continuation of application Ser. No. 413,405, Nov. 24, 1964. This application Mar. 14, 1967, Ser. No. 641,397
1 Claim. (Cl. 35—46)

ABSTRACT OF THE DISCLOSURE

A skeleton globe which is assembled element-by-element from a shaft, a series of elongated semi-circular curved elements, a series of ring-like elements, detachable resilient land mass elements and a planetary ring concentric with the globe.

---

This application is a continuation of my patent application Ser. No. 413,405, filed Nov. 24, 1964, now abandoned. This invention relates to a teaching aid and, more particularly, to apparatus arranged to facilitate the teaching of geography.

In the teaching of geography to younger children, considerable difficulty is experienced in helping them to visualize the relationships of the various divisions of the earth, especially the arrangement of the lines of longitude and latitude to the axis of the earth. Particularly difficult is the visualization of the angles which exist at the center of the earth between the lines of longitude and latitude and the earth's axis. Attempts to teach these subjects to children in the past have been made by making use of solid globes made of slate and by use of the conventional spherical globe mounted on a stand. Not only are these articles quite expensive (so that it is not possible to provide each class with one) but they do not lend themselves to a progressive teaching system in which the relationship of the various geographical elements are added to the student's knowledge, one by one, to result in his eventually learning a rather complicated mass of information in accordance with modern programmed teaching techniques. These and other difficulties experienced with the prior art devices have been obviated in a novel manner by the present invention.

It is, therefore, an outstanding object of the invention to provide a teaching aid by which knowledge of the various geographical elements may be presented to the student in a step-by-step procedure.

Another object of this invention is the provision of a teaching aid for teaching information concerning the earthly globe, which apparatus is inexpensive to manufacture, which is light in weight, and which may be dismantled and stored in a small space.

A further object of the present invention is the provision of a teaching aid to assist the teacher in presenting information concerning geography in which the interest of the student is readily stimulated.

It is another object of the instant invention to provide a teaching aid in which a globe may be constructed part to a considerable amount of mishandling without damage and in which lost or broken parts may be readily replaced.

It is a further object of the instant invention to provide a teaching aid in which a globe may be constructed part by part by the teacher, so that information is given to the student in a programmed manner.

With these and other objects in view, as will be apparent to those skilled in the art, the invention resides in the combination of parts set forth in the specification and covered by the claim appended hereto.

Figure 1:
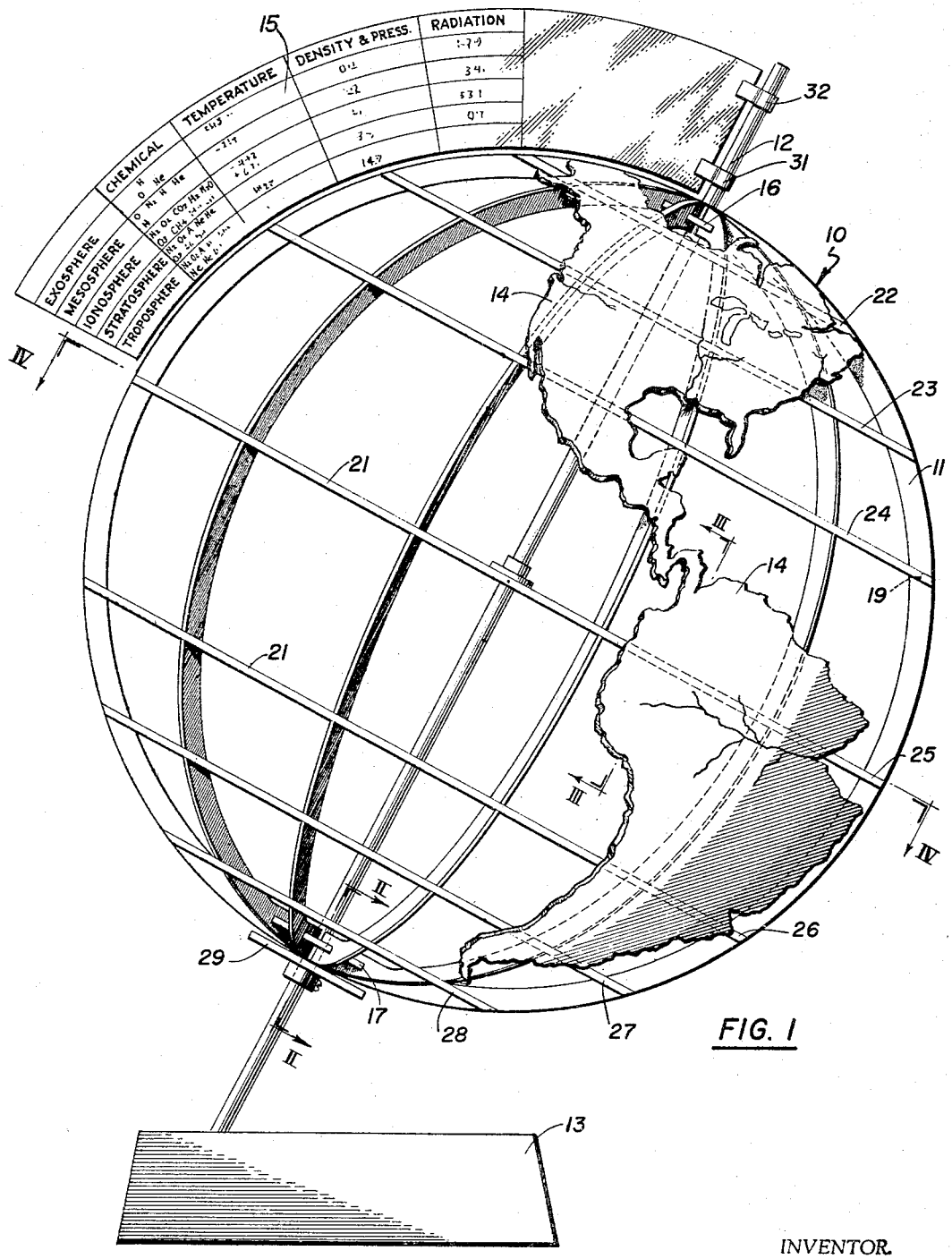
Figure 2:
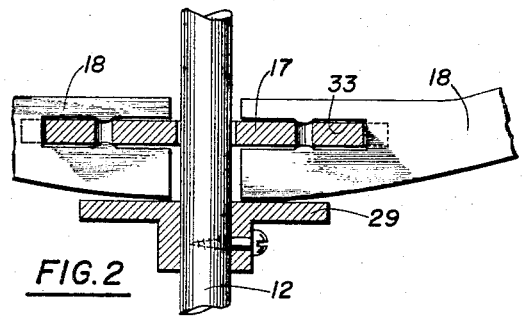
Figure 3:
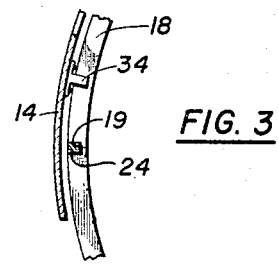
Figure 4:
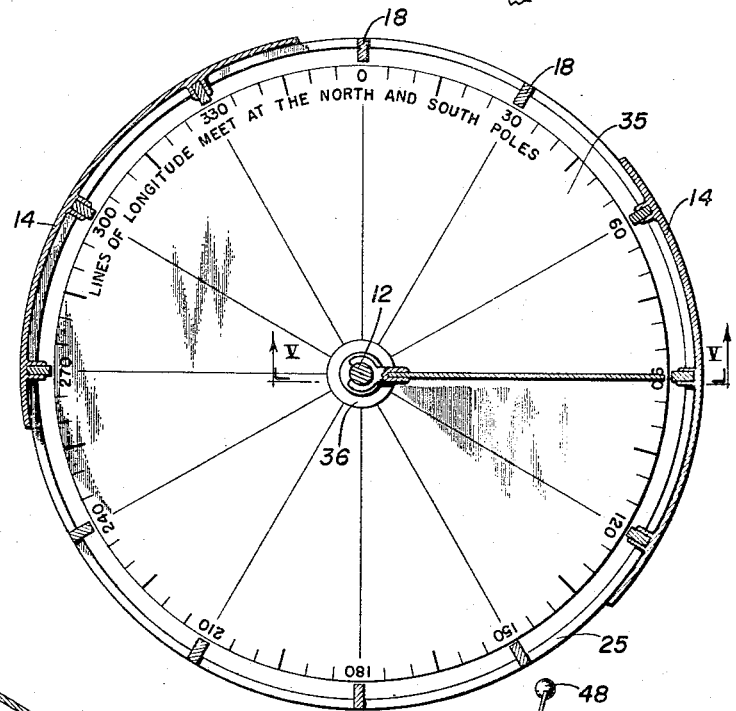
Figure 5:
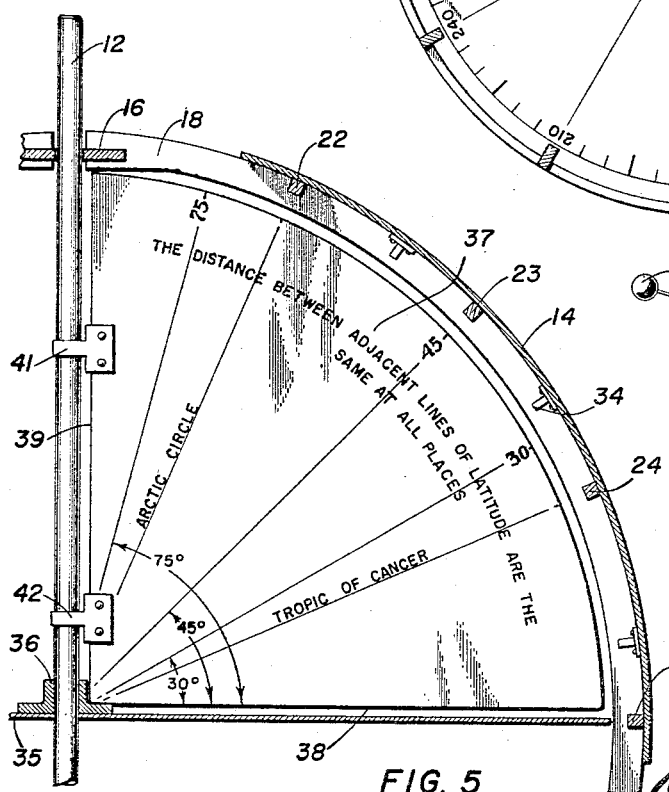
Figure 6:
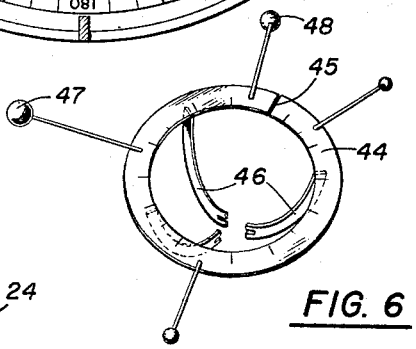

The character of the invention, however, may be best understood by reference to one of its structural forms as illustrated by the accompanying drawings in which:

FIG. 1 is a perspective view of a teaching aid embodying the principles of the present invention, FIG. 2 is an enlarged sectional view of the invention taken on the line II—II of FIG. 1, FIG. 3 is an enlarged sectional view of the invention taken on the line III—III of FIG. 1, FIG. 4 is a sectional view of the invention taken on the line IV—IV of FIG. 1, FIG. 5 is a sectional view of the invention taken on the line V—V of FIG. 4, and FIG. 6 is a perspective view of an accessory for use with the invention.

Referring first to FIG. 1, wherein are best shown the general features of the invention, the teaching aid, indicated generally by the reference numeral 10, is shown as consisting of a skeleton globe 11 mounted on a shaft 12, the lower end of which is fastened in a base 13. The shaft 12 is representative of the axis of the earth and is inclined to the bottom surface of the base 13 at an angle commensurate with the inclination of the axis of the earth to the plane of the ecliptic. Fastened to the outer surface of the skeleton globe 11 are land mass elements 14 having a curvature the same as the curvature of the globe. These elements are formed to be representative of the continents, islands, and other features of the earth. Also mounted on the exterior of the globe 11 is an atmosphere element 15.

Arranged in spaced positions along the shaft 12 are hubs 16 and 17, each hub having a radially-extending flange and being located on the shaft for rotation at the vicinity of the North and South Poles, respectively. Extending from the hub 16 to the hub 17 is a series of elongated curved elements 18 representing the lines of longitude. In the preferred embodiment one of these would be located every 30° of longitude around the globe. These curved elements are provided with a series of outwardly-directed notches 19 in which rest a series of ring-like elements 21 which represent the lines of latitude. These latitude elements, of course, are of various sizes and, in the preferred embodiment, are located so that the ring-like element 22 represents the Arctic Circle. A ring 23 is located at 45° North Latitude, a ring 24 represents the Tropic of Cancer, a ring 25 represents the Equator, a ring 26 represents the Tropic of Capricorn, a ring 27 represents 45° South Latitude, and a ring 28 represents the Antarctic Circle. A large disc 29 is fastened on the shaft 12 and supports the globe 11, so that it may be turned about the shaft 12.

The atmosphere element 15 is shown as being a curved strip which is provided with clips 31 and 32 adapted to be fastened to the shaft 12 so that the element lies in the plane of the arc of a great circle. This element is provided with indicia to show the conditions of chemical, temperature, density, pressure, and radiation in the various levels of the atmosphere, including the troposphere, the stratosphere, the ionosphere, the mesosphere, and the exosphere.

FIG. 2 shows, specifically, the manner in which the curved elements 18 are attached to the hub 17. The hub 17 has a radially-extending flange and the ends of each of the curved elements 18 is provided with a slot 33 which fits tightly over the flange of the hub 17 to lock the curved element 18 in place. The disc 29 is firmly locked to the shaft 12, while the hub 17 is free to rotate about it. The curved elements 18 are similarly attached to the hub 16 at their upper ends.

In FIG. 3, it can be seen that the curved longitude elements 18 are provided with a series of notches 19 placed in suitable locations and adapted to receive the ring-like latitude elements, such as the equatorial element 24. Each of these latitude elements 21 is of a resilient nature and can be forced down over the curvature of the curved longitude elements 18 until it reaches its particular series of notches 19. At that time, it snaps into the notches and, in the prefered embodiment, lies entirely within the notch, so that it does not extend outwardly from the outer curved edge of the curved longitude element 18. This permits the land mass element 14 to fit smoothly over the skeleton globe 11. Each of the land mass elements is provided with clips, such as the clip 34, which fit over the outer edge of a curved longitude element 18 to hold it in place on the globe.

As is evident in FIG. 4, the apparatus is provided with a large disc 35 located in the plane of the Equator element 25. This disc is provided with a central hub 35 having a bore which slides with a certain degree of friction along the shaft 12, so that it can be held in place in its proper location. The disc extends outwardly so that its circumference lies close to the inner edges of the curved longitudinal elements 18. On its upper surface, it is provided with indicia of the lines of longitude, so that it is possible to demonstrate the angles between the projections of the lines of longitude on the plane of the Equator.

In FIG. 5 is shown a latitude element 37 having the shape of a 90° sector of a disc. It is provided with one straight edge 38 which lies closely above the disc 35. Its vertical straight edge 39 lies along the shaft 12 and is attached to it by clips 41 and 42. The outer peripheral edge 43 lies closely adjacent the inner edge of one of the curved longitude elements 18. The element 37 carries indicia indicative of the angles between the lines of latitude.

FIG. 6 shows an annular planet ring 44 which is split to provide an opening 45 to render the ring resilient. Downwardly-extending legs 46 serve to support the ring in the plane of the Equator. The legs are notched at their lower free ends for clipping to the disc 29. Suitable rods and model planets 47 and 48 may be attached to the ring and the upper surface of the ring printed with indicia descriptive of the solar system.

The operation of the invention will now be readily understood in view of the above description. In teaching the young student the various relationships of the elements of the globe, the teacher would normally start using only the base 13 and the shaft 12 with the disc 29 already in place, of course. The teacher would slide over the shaft 12, the hubs 17 and 16 with the disc 35 between them. The teacher then attaches to them the various curved longitude elements 18. It is possible to locate the curved longitude elements 18 in suitable locations around the globe by the use of the indicia on the disc 35. In the preferred embodiment, these would be located every 30°. Presumably, the ring-like latitude elements 28, 27, and 26 have previously been placed over the shaft 12 and lie on the upper surface of the base 13. It is then possible to snap these in place in their notches 19 on the curved elements 18. The latitude elements 22, 23, 24, and 25 would be placed on the globe from the upper end. While these elements are being snapped in place, the teacher describes the name of each one, and describes its geometric relationship to the axis of the earth, as represented by the shaft 12. Previous to placing the latitude elements 22, 23, 24, and 25 in place, the latitude element 37 should be placed in the interior of the globe by snapping its clips 41 and 42 around the shaft 12 and allowing the 90° corner to rest on the hub 36 associated with the disc 35. Then, when the latitude elements 22, 23, 24, and 25 are snapped in place in their notches 19 in the longitude elements 18, the latitude element 37 indicates the names of these elements. It also indicates other angles and demonstrates the relationship of the lines of latitude with the plane of the Equator and the axis of the earth. Then, the land mass elements 14 are snapped in place on the skeleton globe 11 that has thus been formed, indicating relationship of the lines of longitude and latitude to the various continents, islands, and other features of the earth. Lastly, the atmosphere element 15 is snapped in place while a discussion takes place of the nature of the atmosphere at various heights and levels from the surface of the earth.

It can be seen that, by use of the present invention, it is possible to provide a teaching aid to facilitate the demonstration to students of the geographical relationships. This teaching aid may be inexpensively manufactured; as a matter of fact, in the preferred embodiment, most of the elements are formed of a semi-resilient plastic, such as polypropylene. Furthermore, it can be seen that all of the elements may be disconnected after the lecture has been completed and placed in a fairly small box, since all of the elements are of a flat nature. The very nature of the present invention demands the attention of the student, so that the teaching lecture is very interesting and can more easily be absorbed by the student. Furthermore, the method described above for adding element by element to the globe while the discussion takes place, lends itself to the so-called "programmed teaching" technique whereby information is presented to the student in small, easily digested quantities with the result that after a while he has assimilated a considerable amount of complicated information with complete understanding.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A teaching aid, comprising a skeleton globe which may be assembled element-by-element including:
  (a) a shaft representative of the axis of the earth having two spaced hubs,
  (b) a series of elongated semi-circular curved elements detachably fastened around the shaft and attached to the hubs to represent lines of longitude, each hub being provided with a radially-extending flange and each end of each curved element being provided with a slot to slide over a flange,
  (c) a series of ring-like elements detachably fastened to the said curved elements to represent lines of latitude, the ring-like elements being of a resilient nature to snap into notches provided for them on the curved elements, said curved elements and ring elements forming said skeleton globe,
  (d) land mass elements with resilient clips for fastening them over the outwardly-directed portions of the curved elements and the ring-like elements, a disc marked with indicia of longitude and having a central aperture permitting it to be located on the shaft centrally thereof to lie in the plane of the Equator, a 90° sector of a disc bearing indicia of latitude and having means for detachably fastening it to the shaft to lie in a plane in which lies the shaft, an arcuate member carrying indicia of various conditions of the atmosphere and detachably fastened to a portion of the shaft extending outwardly of said curved elements to extend outwardly in the plane of an arc of the great circle, and
  (e) a disc mounted on said shaft, a resilient planet ring carrying downwardly extending inwardly curved legs detachably fastened to said disc, said legs having dimensions to locate said planet ring concentric with said globe and an arm supported by and extending outwardly from said planet ring and carrying a spherical model of a planet at its free end.

References Cited

UNITED STATES PATENTS

| | | | |
|---|---|---|---|
| 855,226 | 5/1907 | Bryant | 35—47 |
| 1,629,582 | 5/1927 | McClintock | 35—46 |
| 1,707,691 | 4/1929 | Sweet | 46—29 |
| 1,986,576 | 1/1935 | Howden | 35—46 |
| 2,399,365 | 4/1946 | Link | 35—47 |
| 2,949,682 | 8/1960 | Humbert | 35—46 |

FOREIGN PATENTS 4,489  1908  Great Britain.

JEROME SCHNALL, *Primary Examiner.*